(12) United States Patent
Springmuhl Samayoa (10) Patent No.: US 9,154,829 B2
(45) Date of Patent: Oct. 6, 2015

(54) INTEGRATED MEDIA SYSTEM AND METHOD

(71) Applicant: Jorge Eduardo Springmuhl Samayoa, Guatemala (GT)

(72) Inventor: Jorge Eduardo Springmuhl Samayoa, Guatemala (GT)

( * ) Notice: Subject to any disclaimer, the term of this patent is extended or adjusted under 35 U.S.C. 154(b) by 0 days.

(21) Appl. No.: 13/621,577

(22) Filed: Sep. 17, 2012

(65) Prior Publication Data

US 2013/0117779 A1 May 9, 2013

Related U.S. Application Data

(63) Continuation of application No. 11/724,148, filed on Mar. 14, 2007, now abandoned.

(51) Int. Cl.
G06F 15/16 (2006.01)
H04N 21/435 (2011.01)
H04N 7/14 (2006.01)

(52) U.S. Cl.
CPC ............ *H04N 21/435* (2013.01); *H04N 7/144* (2013.01); *H04N 7/148* (2013.01)

(58) Field of Classification Search
None
See application file for complete search history.

(56) References Cited

U.S. PATENT DOCUMENTS

| | | | |
|---|---|---|---|
| 5,333,266 A | 7/1994 | Boaz et al. | |
| 5,867,494 A | 2/1999 | Krishnaswamy et al. | |
| 6,535,889 B1 | 3/2003 | Headrick et al. | |
| 6,718,366 B2 | 4/2004 | Beck et al. | |
| 6,754,181 B1 | 6/2004 | Elliott et al. | |
| 6,909,708 B1 | 6/2005 | Krishnaswamy et al. | |
| 6,933,928 B1* | 8/2005 | Lilienthal | 345/173 |
| 7,145,898 B1 | 12/2006 | Elliott | |
| 7,249,319 B1* | 7/2007 | Payne et al. | 715/209 |
| 2001/0018769 A1 | 8/2001 | Matsui | |
| 2001/0025309 A1 | 9/2001 | MacLeod Beck et al. | |
| 2002/0064149 A1 | 5/2002 | Elliott et al. | |
| 2002/0095462 A1 | 7/2002 | Beck et al. | |
| 2002/0116421 A1* | 8/2002 | Fox et al. | 707/526 |
| 2003/0046071 A1* | 3/2003 | Wyman | 704/235 |
| 2003/0164852 A1* | 9/2003 | Simpson et al. | 345/748 |
| 2004/0006509 A1 | 1/2004 | Mannik et al. | |
| 2004/0100508 A1* | 5/2004 | Hansson | 345/863 |
| 2004/0111473 A1* | 6/2004 | Lysenko et al. | 709/206 |
| 2004/0143673 A1* | 7/2004 | Kristjansson | 709/231 |
| 2004/0167768 A1 | 8/2004 | Travieso et al. | |
| 2004/0205641 A1* | 10/2004 | Shimizu | 715/527 |
| 2005/0162689 A1* | 7/2005 | Roztocil | 358/1.15 |
| 2006/0200517 A1* | 9/2006 | Nelson et al. | 709/204 |
| 2007/0180479 A1* | 8/2007 | Gravina et al. | 725/87 |

FOREIGN PATENT DOCUMENTS

WO WO 2008/155660 A2 12/2008

* cited by examiner

*Primary Examiner* — Kristie Shingles
*Assistant Examiner* — Keyvan Emdadi
(74) *Attorney, Agent, or Firm* — Malloy & Malloy, P.L.

(57) ABSTRACT

An integrated media system and method comprising a media server and one or more client interfaces disposed in communicative relation with a network. The media server may be structured to communicate an interactive media object to the client interface over the network. The interactive media object comprising at least one primary communication module, at least one secondary communication module having multimedia content, and one or more communication services, such as, for example, e-mail, VoIP, live chat, etc. Further, the primary communication module may be structured to resemble a printed publication.

24 Claims, 4 Drawing Sheets

INTEGRATED MEDIA SYSTEM AND METHOD

CLAIM OF PRIORITY

The present application is a continuation patent application of previously filed, now pending application having Ser. No. 11/724,148, filed on Mar. 14, 2007, the content of which is hereby incorporated in its entirety by reference.

BACKGROUND OF THE INVENTION

1. Field of the Invention

The present invention is directed to an integrated media system and method structured to integrate a plurality of multi-media content and/or services to facilitate interactive electronic distribution through at least one network.

2. Description of the Related Art

As technology continues to expand into a variety of new and exciting developments, people of today's society have embraced innovative ways of communicating with each other and/or gathering information, such as news, currents events, gossip, etc. More in particular, society has become more and more dependent on the Internet for communication with friends and family, as well as a gateway for gathering news and other related information. For example, friends and family have come to rely heavily on electronic mail and/or live chat to stay in contact and/or to communicate with each other. Further, as new communicative technology continues to be developed, such as Voice over Internet Protocol (VoIP), video conferencing over the Internet, and short messaging service (sms), people tend to embrace such new technological developments and rely on them for their main source of communication.

Furthermore, as the Internet continues to expand and influence the day-to-day activities of today's society, hard copies or printed copies of newspapers, magazines, journals, encyclopedias, dictionaries, and other similar books or publications may become less and less prominent. This may partially be due to the fact that people have come to rely on the Internet as their main source of gathering information, such as the news, current events, sports updates, stock quotes, and the like.

Further, while reading the news, sports entertainment, or celebrity or public gossip, the reader may want to contact the author of a particular article, painting, or photograph. Moreover, the reader may want to criticize or comment on the article, or to otherwise strike up conversation with the author or other contact person. Additionally, people are always looking for easier ways to reach or contact sellers/buyers of items such as automobiles or houses shown or advertised in the classified ads section of a newspaper or magazine.

In addition, may people who choose not to embrace new communicative technology, whether it be communication services, such as Voice over Internet Protocol, live Internet chat, short messaging service, or even interactive multi-media, do so merely because they are not exposed to the technology.

Accordingly, there is a current need in the art for a new integrated media system structured to combine or integrate a plurality of new, innovative and communicative developments into one easy-to-use system. More in particular, it would be beneficial if the proposed integrated media system includes one or more communication modules structured to communicate news, current events, sports updates, stock quotes, and the like to one or more users of a client interface. In addition, the proposed integrated media system may further include one or more communication services structured to facilitate friends and family to communicate with each other and remain in close contact. It would further be beneficial of the proposed integrated media system were structured to facilitate the users to communicate with the authors, editors, or creators of the communication modules, such as news articles, magazine excerpts, and the like.

Thus, the proposed integrated media system may include one or more media management systems, including, for example, a web or Internet server, and one or more client interfaces. It would be particularly advantageous, if the media management system and client interface are disposed in communicative relation with at least one network, such as, for example, the Internet. Accordingly, the proposed integrated media system may be easily and conveniently accessed from anywhere in the World where an Internet, or other network connection may be established.

SUMMARY OF THE INVENTION

The present invention is directed to an integrated media system and method, which may include at least one media management system or server and at least one, but more practically, a plurality of client interfaces. Further, the media server(s) and client interface(s) are preferably disposed in communicative relation with one or more networks, such as, for example, the Internet, or an Intranet.

Accordingly, the media management system of at least one preferred embodiment of the present invention may include any computer or other like device structured to provide services or otherwise communicate media to other computers, as described in accordance with the various embodiments of the present invention. Preferably, the media management system includes a web server, however other like devices may be implemented, such as, for example, communication servers, client-servers, and the like. As such, the media management system or server of the various embodiments of the present invention include a computer processor, memory and/or storage device, and network or communication circuitry or components. As will be discussed herein, the processing capabilities include receiving, converting and/or formatting various media (e.g., articles, stories, etc.) into a predetermined format, such as a format intended to mimic or otherwise resemble a printed publication, such as a news paper or magazine article.

Further, in at least one embodiment of the present invention, the client interface of the integrated media system may include any computer, or other similar device structured to display multi-media content, such as audio, video, animation, and/or text. The client interface may also preferably be structured to run at least one communication service, such as, live chat, e-mail, VoIP, etc. As such, the client interface of the present invention may comprise a desktop, notebook, or laptop computer. However, many other devices may also be utilized, such as, for example, a game console, Personal Digital Assistant (PDA), or a cellular telephone.

Moreover, in at least one preferred embodiment of the present invention, the media server may be structured to communicate, display, and/or transfer an interactive media object to the one or more client interfaces. The interactive media object may include at least one primary communication module, secondary communication module, and/or communication service. In one embodiment, the primary communication module may be structured to resemble, either visually and/or interactively, a printed publication. For example, the primary communication module may at least partially resemble a newspaper, magazine, journal, book, and the like.

Additionally, the secondary communication module(s), and/or secondary media content thereof, may include multimedia content such as audio, video, and/or animation. Further, the secondary communication module(s) and/or secondary media content may be associated in substance with the primary communication module or primary media content thereof. Furthermore, the secondary media content of the various embodiments of the present invention is combined with or otherwise displayed adjacent to or simultaneously with the associated primary media content, including, but not limited to being disposed in at least partially embedded, overlying, or communicative relation with the primary communication module.

Moreover, in one embodiment, in order to view, activate, or start the secondary communication module or secondary media content, a user may be required to click on, for example, a button or link. However, the secondary communication modules or content thereof may, in other embodiments, be structured to be automatically activated upon the occurrence of certain predetermined events, such as the display of the primary media content.

For exemplary purposes only, the primary media content of the primary communication module may contain an article or excerpt of an interview or speech of an individual, such as an athlete or politician. In such an instance, the one or more secondary communication modules may include secondary media content substantially similar or otherwise associated in content to the primary media content such as an audio clip and/or video clip of the actual speech or interview. Accordingly, a user may click on a link or button preferably disposed near the article or excerpt which may activate and/or play the secondary communication module. Moreover, the video, audio, or other secondary communication modules may be displayed either in a new window and/or a designated area of the already displayed window on the client interface. Furthermore, as above, the secondary communication module may be structured to begin to play or be activated, for example, automatically when the respective article is displayed.

In addition, the one or more communication services may, but need not be disposed in an embedded, overlying, or communicative relation with the primary communication module. As such, the interactive media system of the present invention may include links or buttons structured to activate the communication services.

The communication services may include, for example, Voice over Internet Protocol (VoIP), video conferencing, electronic mail (e-mail), short message service (sms), or live chat. In at least one preferred embodiment of the present invention, the communication services may be run in a separate window. However, the communication services may be displayed, activated, or run in the already open window displaying the interactive media object on the client interface.

Further, a user of one or more client interfaces may have the ability to activate the communication services and communicate with a plurality of individuals or entities. Moreover, the communication services may be structured to facilitate a user to communicate with authors of articles or excerpts in the primary communication module. In addition, by utilizing the communication service of at least one embodiment of the present invention, a user may communicate with other users or non-users of the interactive media system of the present invention. In such a manner, the system of the present invention is structured to create a social networking experience for the various third party users thereof in that the third party users or readers can communicate with one another in real-time to discuss the primary and secondary media content or other desired topics.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
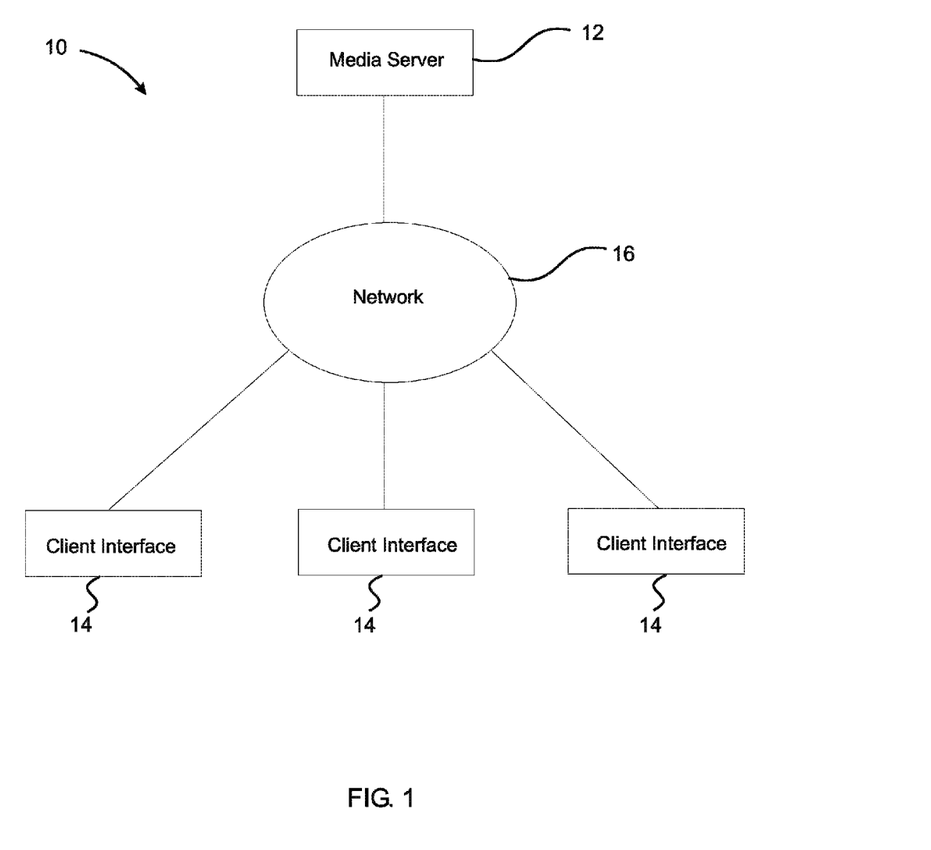
FIG. 1 is a schematic representation of one preferred embodiment of the integrated media system of the present invention having a network configuration.

As shown in the accompanying drawings, and primarily FIG. 1, the present invention is directed to an integrated media system, generally indicated as 10. The integrated media system 10 of the present invention may include at least one media management system or server 12 and at least one client interface 14. In at least one preferred embodiment of the integrated media system 10 of the present invention, both the media management system or server 12 and the client interface 14 are preferably disposed in communicative relation with at least one network 16.

The media server 12 of at least one embodiment of the present invention may comprise any computer or other device structured to provide services to other computers or other like devices, or otherwise communicate media objects to other computers. For example, the media server 12 may include an application server, a communication server, a client-server, a peer-to-peer server, a web server, or any other similar device or computer structured to facilitate the intended function of the integrated media system 10 of the present invention. Accordingly, the media server 12 of at least one preferred embodiment of the present invention may comprise a server, a desktop computer, and/or a laptop or notebook computer. However, the media server 12 may also include a video game console, a Personal Digital Assistant (PDA), a cellular telephone, or any other similar device(s).

Further, in at least one embodiment of the present invention, the client interface 14 may include any computer or other device structured to display interactive media content and/or run communication services. Accordingly, the client interface 14 may include a desktop computer or a notebook/laptop computer. However, the client interface 14 is in no way limited to such devices, and may include, for example, a game console, a Personal Digital Assistant (PDA), a cellular telephone, or any other similarly structured handheld devices.

Still referring to FIG. 1, the media management system or server 12 and the client interface(s) 14 are preferably disposed in communicative relation with a communication network 16. More in particular, the media server 12 and the client interface 14 may be at least partially linked together for example with phone lines, high speed cables, and/or wirelessly. Accordingly, the network 16 may preferably include the Internet, however, any communicatively linked network or plurality of networks may be implemented.

Moreover, in at least one preferred embodiment of the integrated media system 10 of the present invention, the media server 12 may be structured to communicate at least one interactive media object 20 to at least one or a plurality of client interfaces 14. In a preferred embodiment, the interactive media object 20 may be communicated from the media server 12 to the client interface(s) 14 through the at least one communication network 16. More in particular, in order to access the interactive media object 20 from a client interface 14, for example, a user may enter a web or Internet address in any Internet web browser, such as, for example, Microsoft Internet Explorer, Mozilla Firefox, Netscape Navigator, and the like.

Furthermore, in order to limit access to the interactive media object 20, a user may be instructed to enter a user name and/or password, or any other security technique(s). Accordingly, a user may be required to be a member and/or pay for access to the interactive media object 20 of the present invention.

Figure 2:
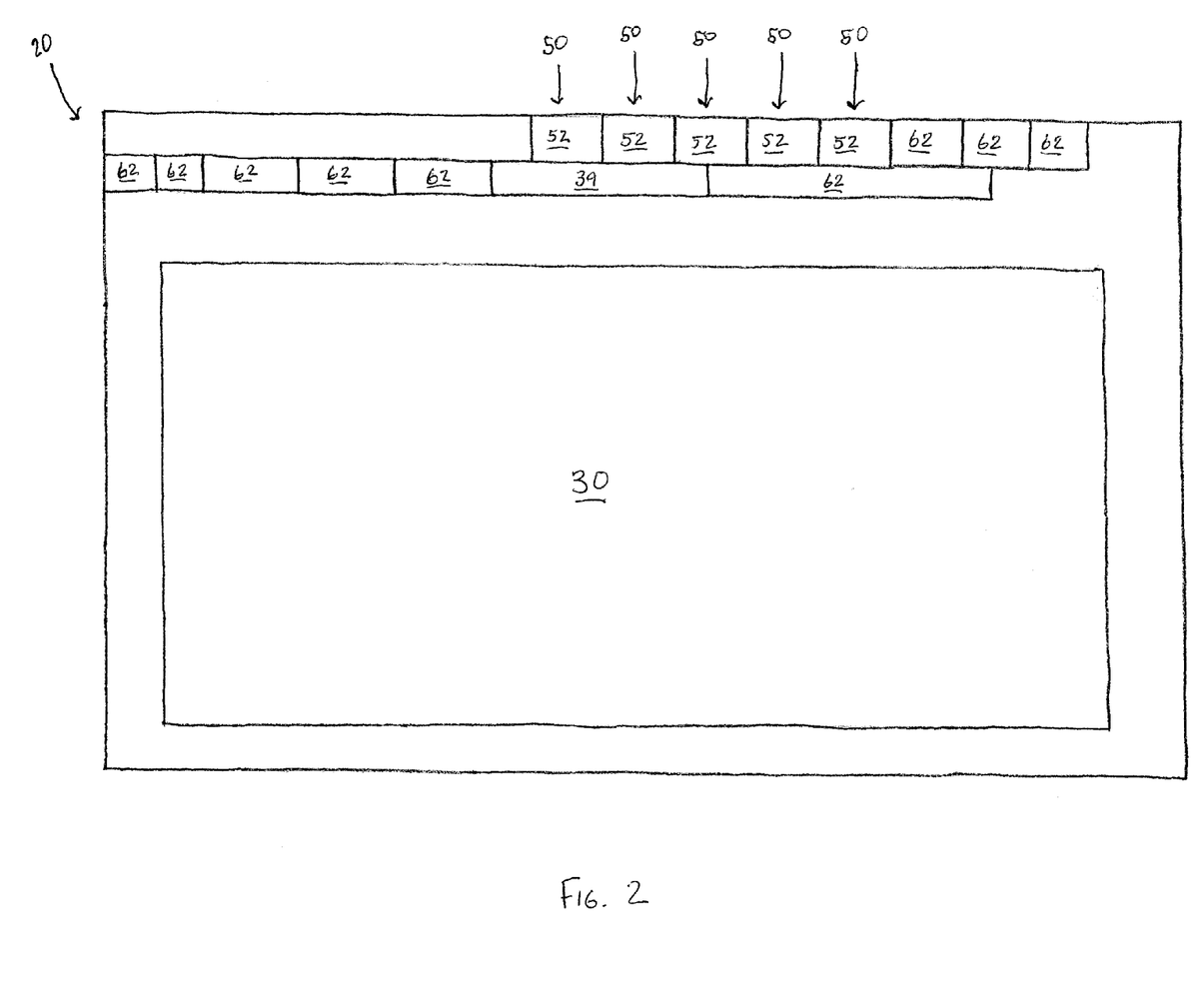
FIG. 2 is a schematic representation of an interactive media object of one preferred embodiment of the present invention as displayed on a client interface.
Figure 2A:
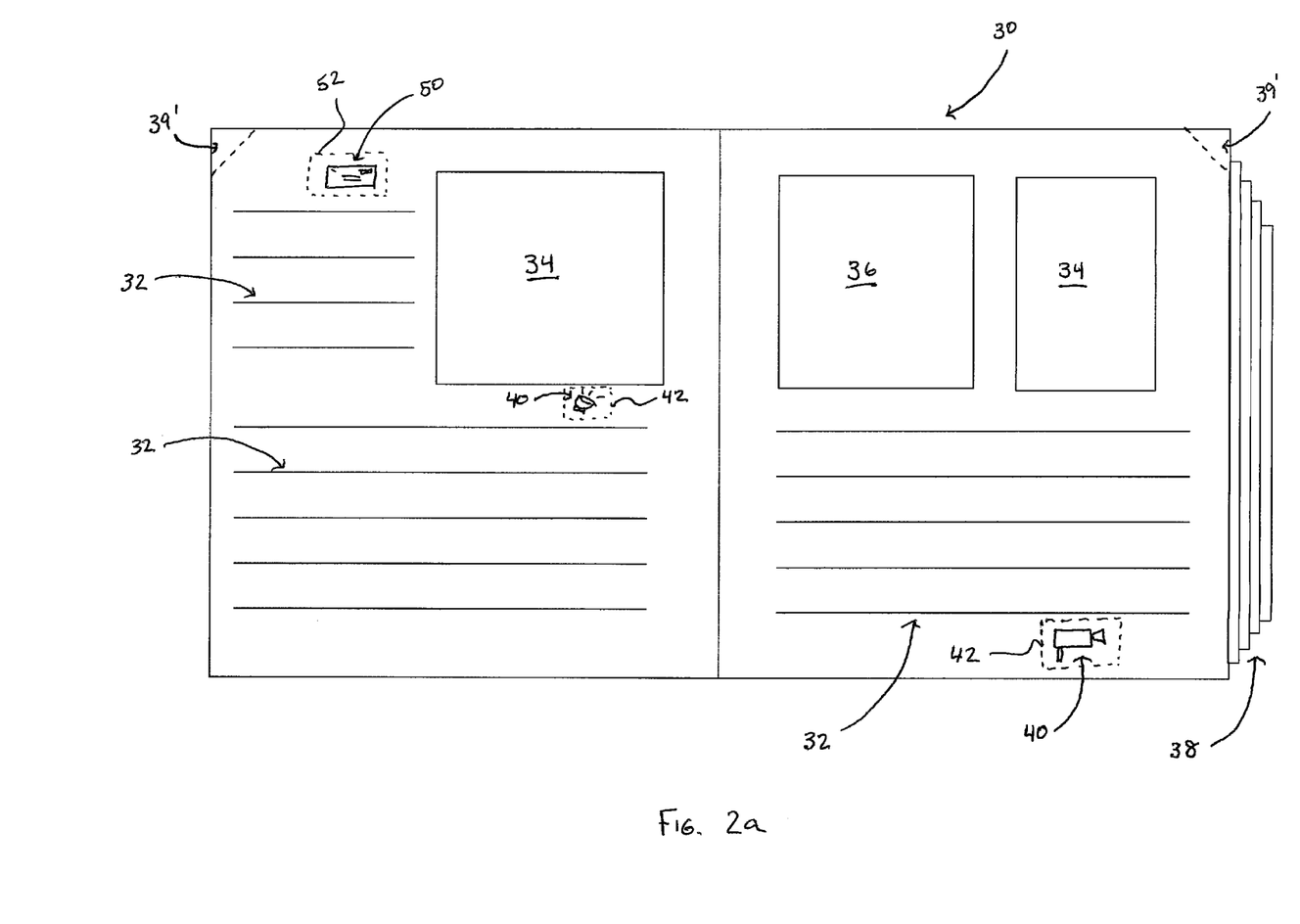
FIG. 2a is a schematic representation of one preferred embodiment of a primary communication module.

Referring to FIG. 2, the interactive media object 20 of at least one preferred embodiment of the interactive media system 10 of the present invention may be structured to include at least one primary communication module 30. As best shown in FIG. 2a, the primary communication module 30 may comprise software code that is structured to format or display primary media content that visually resembles any one of a plurality of distributed hard copy formats. More in particular, a distributed hard copy format may include, for example, a newspaper format, a magazine format, a journal format, and the like. The newspaper, magazine, or journal need not actually exist or have been distributed; rather, the primary communication module may merely resemble such formats.

Specifically, the primary communication module 30 may be structured to at least partially interactively and/or visually resemble a printed publication. For example, the primary communication module 30 may include a digital rendition and/or at least partial replica of a magazine, newspaper, journal, guide, book, encyclopedia, dictionary, or any other similar structure or device. However, the printed publication from which the primary communication module 30 is structured to resemble need not actually be published or even exist. Accordingly, the primary communication module 30 may be structured to merely visually resemble the structure and/or layout of a magazine, newspaper, journal, guide, or other like printed publications.

Thus, the primary communication module 30 of the various embodiments of the present invention include primary media content which can include textual content 32, graphical content 34, pictorial content 36 and/or any combination thereof. The textual content 32 may include written articles and/or excerpts. Further, the graphical content 34 may comprise, for example, drawings, paintings, or comics, whereas the pictorial content 36 may include actual photographs or pictures.

Moreover, the primary communication module 30 of one embodiment of the present invention need not resemble, visually, interactively, or otherwise, a printed publication. The primary communication module 30 of at least one embodiment of the present invention may resemble or include animation(s), moving video(s), drawing(s), comic(s), painting(s), sculpture(s), etc.

Further, the printed publication, or other like device from which the primary communication module 30 may be structured to resemble may include a plurality of pages, chapters, volumes, etc. Accordingly, the primary communication module 30 of at least one embodiment of the present invention may include a digital rendition or at least partial replica of at least one or a plurality of pages 38. Accordingly, preferably at the direction of a user, the pages 38 may be "changed", "flipped", or otherwise "turned" in order to navigate through the textual 32, graphical 34, pictorial 36, and/or other multimedia content of the primary communication module 30. As such, the interactive media object 20 may further be structured to include one or more links, buttons, or other devices 39 and 39' which may allow or facilitate a user to operatively change the visually displayed page, chapter, and/or volume. As shown in FIG. 2a, the links, buttons, or devices 39' may be disposed in an embedded, communicative, or overlying relation to the primary communication module 30, for example, at or near the upper edges thereof. However, FIG. 2 illustrates that the links, buttons, or other devices 39 or 39' may be disposed in a non-overlying or a non-embedded relation with the primary communication module 30.

Accordingly, the navigation capabilities of the interactive media object of the present invention are structured to facilitate successive navigation through the plurality of page displays of the primary media content of the primary communication module. It should be apparent that the primary media content may span across multiple pages, similar to a multiple page newspaper article, as just one example. Therefore, the navigation from one page display of the present invention to a second, successive page display of the present invention is structured to visually resemble page turning of a physical printed publication. For example, on the client interface or computer from which the present invention is being accessed and displayed, navigating from one page to another will result in a visual representation of a page being turned. Therefore, if the page is being turned from right to left (e.g., similar to a newspaper or magazine page turn), then the visual graphics of the interactive media object of at least one embodiment is structured to display a page turning from right to left, gradually revealing the primary media content on the second page and, similarly, gradually covering up the primary media content on the first page, and finally wherein the second page (and primary media content displayed thereon) is displayed on the display screen of the client interface, and the primary media content from the first page is no longer visible. Again, in this manner, the navigation capabilities of the interactive media object of at least one embodiment is structured to visually and graphically resemble page turning of a physical printed publication.

Furthermore, in at least one preferred embodiment of the present invention, the interactive media system 10 may include at least one, but preferably a plurality of secondary communication modules 40, each of the secondary communication modules comprising secondary media content. As shown in FIG. 2a, at least one or a plurality of the secondary communication modules 40 of the present invention may, but need not, be disposed in an at least partially embedded, overlying, or communicative relationship with the primary communication module 30. In particular, the secondary media content of the secondary media module is simultaneously displayed adjacent to or otherwise visually within the primary media content on a common display screen or display page.

Moreover, in at least one preferred embodiment of the present invention, the secondary media content of the secondary communication modules 40 may comprise an audio feed, a video feed, pictorial or graphical content, animation and/or any other object or device structured to facilitate the intended operation of the present invention. Furthermore, the secondary communication modules 40 of at least one preferred embodiment of the present invention may be structured and disposed to be operatively activated by a user. More in particular, the interactive media object 20 of the present invention may comprise one or more activation devices 42 such as a link or button structured to be activated by a user. However, the secondary communication modules 40 of the present invention may be structured to be automatically displayed, played, and/or otherwise activated. Once the activation device 42 is activated by the user, either by clicking on the device 42 with a mouse or other pointing device, hovering over it, or pressing it, the secondary communication module 40 may be activated.

Moreover, for example, in the case wherein the activated secondary communication module 40 is an audio feed, the respective sound or audio will be heard through the speakers connected to, integrated in, or otherwise disposed in communicative relation with the client interface 14. However, the secondary communication module 40, once activated, may be disposed or displayed in a pop-up window or other similar structure, preferably in the case wherein the secondary communication module 40 includes, for example, a video feed, pictorial content, or any other visually oriented structure.

Accordingly, in the embodiment wherein at least one primary communication module 30 is structured to partially resemble a printed publication, as is illustrated in FIG. 2a, the secondary communication module(s) 40 may be disposed an at least partially embedded and/or overlying relation to specific predetermined portions thereto. For exemplary purposes only, the primary communication module 30 may include an article, headline, comment, and/or any other reference to a speech, concert, radio segment, song, etc. At least one secondary communication module 40 may include an audio, video, or other similar digital rendition of the actual speech, concert, radio segment, and/or song. In such an instance, the interactive media object 20 of the present invention may include a link, button, or other similar device 42 disposed on or near the respective portion of the primary communication module 30. A user may, then, activate or start the secondary communication module 40, for example by clicking on, touching, or hovering a mouse over the respective link or button 42.

Particularly, the secondary communication module or secondary media content may comprises a cover image or default display image which is displayed to the user until the secondary media content is activated. For example, in the embodiment wherein the secondary media content comprises a video that is structured to play upon user activation, the video or secondary media content may comprise a cover image or default display image that is displayed to the user until the user plays the video or activates the content. The cover image may be a static non-moving graphical image, an animation, gif, or other visual representation.

As described herein, the secondary media content of at least one embodiment is at least partially associated in content to the primary media content. Specifically, in the event the primary media content comprises an article or text concerning a newly released movie, for example, the secondary media content comprises related or associated content, such as, for instance, a trailer for the same movie referenced in the primary media content. Accordingly, as many news articles or magazine entries include text and graphics, the secondary media content can be positioned or formatted with the primary media content such that the object as a whole (i.e., combined primary and secondary media content) visually resembles a printed publication with text (from the primary media content) and graphics (the default or cover image from the secondary media content). However, in the embodiment just described, the secondary media content (e.g., video or movie trailer) can be activated to provide an interactive experience for the user.

Additionally, in at least one embodiment of the present invention, the interactive media object 20 of the interactive media system 10 may further include at least one, but preferably a plurality of communication services 50. Further, as will be described in greater detail below, as shown in FIG. 2a, at least one of the communication services 50 may be disposed in an at least partial embedded and/or overlying relation to the primary communication module 30.

The communication services 50 of at least one embodiment of the present invention may include Voice over Internet Protocol (VoIP), video conferencing, electronic mail (e-mail), short message service (sms), live chat, and/or any other similarly structured communication software or service. The interactive media object 20 of at least one embodiment of the present invention may include an activation device 52 such as a link, button, or other similar device structured to run, start, or activate the software for the communication service(s) 50 of the present invention. For exemplary purposes only, in the embodiment of the present invention wherein the primary communication module 30 at least partially resembles a printed publication, the primary communication module 30 may include textual 32, graphical 34, or pictorial 36 content, as well as an identified author or contact person thereof. Accordingly, as shown in FIG. 2a, the interactive media object 20 of the present invention may include an activation device 52 disposed in an overlying relation with the primary communication module 30. The activation device 52 may be structured to activate at least one communication service 50, e.g., e-mail, sms, live chat, etc., such that the user may contact or otherwise communicate with the identified author or other contact person or entity.

In addition, referring once again to FIG. 1, however, the interactive media object 20 may include activation device(s) 52 such as links, buttons, or other devices disposed adjacent to, or otherwise not disposed in an embedded relationship with, the primary communication module 30. Accordingly, the user of the interactive media system 10 of the present invention at the client interface 14 may utilize the communication services 50 to contact and/or otherwise communicate with users at other client interfaces 14, or any other individual or entity through the network 16, whether utilizing the interactive media system 10 of the present invention, or not. Accordingly, in one embodiment, the communication services of at least one embodiment of the present invention are structured to provide a social networking experience or group for the user(s) in that a reader of one article, or third party recipient of the primary content, may activate the communication services and connect with other third party readers of the same, related, or unrelated content. As an example, a user reading primary content related to the release of a new movie, and viewing the secondary content related or associated therewith, may activate the communication services and connect with other users who are also reading or viewing the same or similar content.

It should be noted, however, that the communication services 50 of the various embodiments of the present invention may be utilized independent from the primary communication module(s) 30 and the secondary communication module(s) 40. In such a manner, a user may activate the communication services and connect with other individuals not connected to or part of the social network associated with the present invention.

In any event, once activated, in at least one preferred embodiment of the present invention, the communication services 50 may be run or displayed in a designated pop-up window, and/or new window. Alternatively, the communication services 50 may run or be displayed in the same window and/or space as the interactive media object 20.

Furthermore, as illustrated in FIG. 2, the interactive media system 10 of at least one embodiment of the present invention may include a plurality of additional activation buttons, links, or other devices 62 structured to provide additional features, functions, or menus. For example, activation device(s) 62 may include a menu or button to save, print, close, or change the viewing preferences or language of the interactive media object 20, or any portion thereof. Further, activation devices 62 may facilitate the navigation through the primary or secondary communication modules 30, 40, for example, by providing a table of contents, a searching feature, a zooming feature, and/or a help function.

In addition, the interactive media system 10 of at least one embodiment of the present invention may include one or more language translators structured to implement a plurality of languages while simultaneously maintaining full interactive capabilities with the user. The language translator(s) may be structured to translate or convert the textual and/or other content of the integrated media object 20 of the present invention into one of a plurality of language formats. More in particular, as will be described below, the language translator may be structured to facilitate automatic or manual translation of the textual or other contents of the integrated media object 20. The translation may be implemented as at least one step in the method 100 of presenting the integrated media system 10, as will be described in detail below. However, the translating may be implemented at the direction of the user, as a real-time function of the system 10. As such, the integrated media system 10 may include a feature or function, represented preferably by a link or button, which may facilitate the user to choose one or more languages in which the contents of the integrated media system 10 will appear or be displayed.

Figure 3:
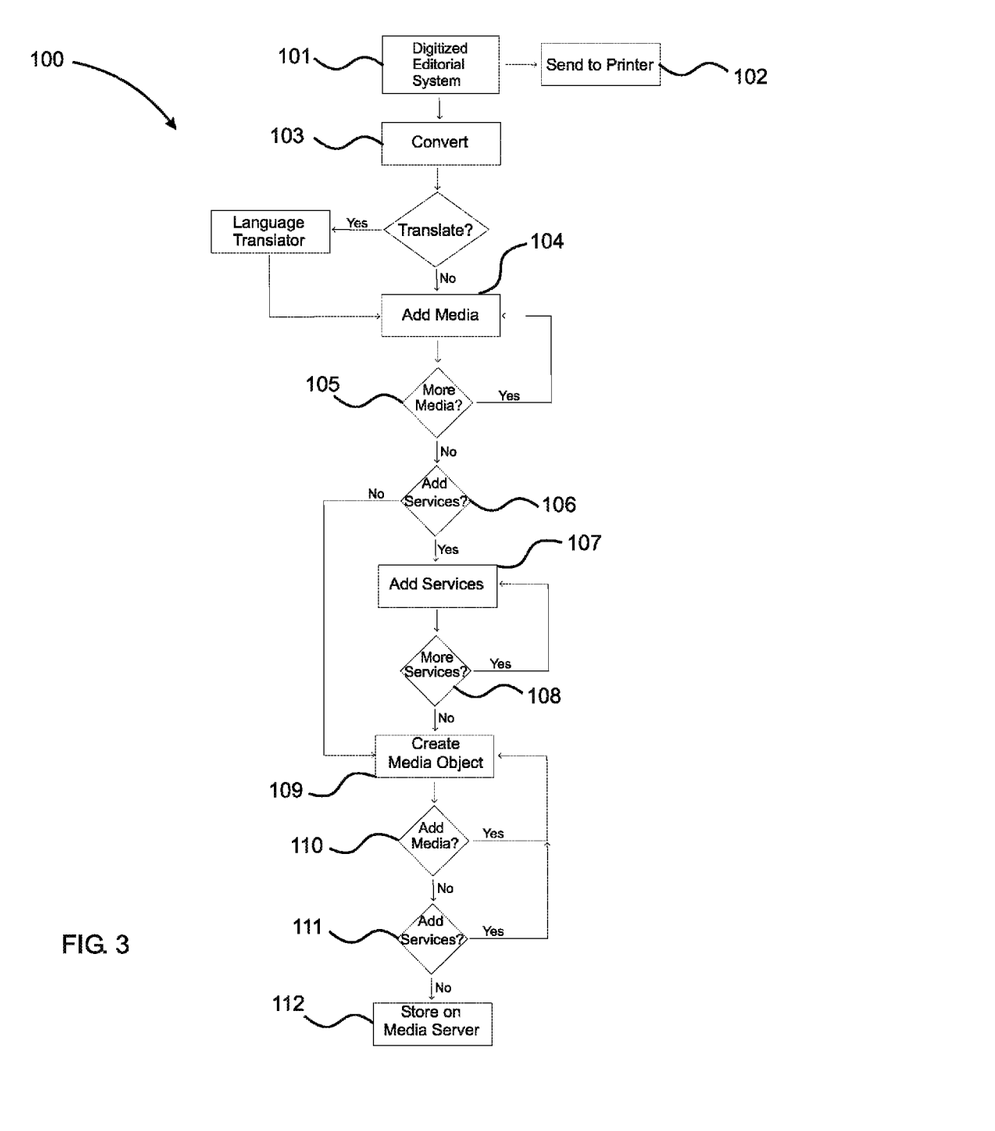
FIG. 3 is a high level logic flow chart of one preferred method of presenting an interactive media system of the present invention.

The present invention further includes a method of presenting an integrated media system 10. At least one preferred method of presenting an integrated media system 10 is illustrated in FIG. 3, and generally indicated as 100. Further, the method 100 may begin with gathering or providing media content in the form of text, graphics, video, audio, animation, etc, as can be seen, for example, at block 101 in FIG. 3. The media content may be in the form of a digitized editorial system, which, as used herein may include a newspaper, magazine, journal, book, or any other similar structure, such as a printed publication. The digitized editorial system includes the editorial system represented in digital form. Specifically, the digitized editorial system may be structured in any readable digital format including, but not limited to, Portable Document Format (PDF) developed by Adobe Systems, Postscript, or any other digital multi-media format(s). However, it should also be apparent that the media content may be in any newsworthy or reportable media that can be formatted and displayed in the manner consistent with the present invention, regardless of whether the content began as a physical printed publication or originated in digital form.

The digitized editorial system or media content may be printed, as shown at block 102, so as to produce a hard copy, such as for example, a tangible newspaper, magazine, journal, etc. Such hard copies may then be sent or delivered to newspaper stands, stores, or other like locations for sale and/or distribution. However, in at least one embodiment of the present invention, the method 100 may include converting or otherwise formatting the media content to generate at least one primary communication module 30, indicated at block 103. Accordingly, the digitized editorial system or digital media content may be converted into programmable or otherwise modifiable file(s) or other similar structure. The primary communication module 30 may be at least partially defined by Extensible Markup Language (XML) or any other programmable or modifiable structure.

Moreover, the method 100 of presenting an integrated media system 10 may include embedding or adding media, such as at least one secondary communication module 40, into the primary communication module 30. As discussed above, the secondary communication module(s) 40 may be disposed in an embedded, overlying, or partial communicative relation to the primary communication module 30. The secondary communication module(s) 40 may be linked to the primary communication module 30 by links, buttons, or other activation devices. Further, more secondary communication modules 40 may continue to be added to the primary communication module(s) 30, as shown at blocks 104 and 105.

In addition, at least on embodiment of the method 100 of the present invention includes adding or embedding at least one communication service 50 into the primary communication module 30, as illustrated in blocks 106, 107, and 108. Similar to the secondary communication modules 40, the communication services 50 may be linked to the primary communication module 30 by links, buttons, or other activation devices.

The method 100 of the present invention may comprise creating an interactive media object 20, as illustrated in blocks 109, 110, and 111 of FIG. 3. More in particular, creating the interactive media object 20 may include combining the primary communication module(s) 30 with additional secondary communication module(s) 40 and/or communication service(s) 50.

The method 100 of presenting an integrated media system 10 of the present invention may further include disposing the interactive media object 20, and/or the primary communication module(s) 30, the secondary communication module(s) 40, and the communication service(s) 50, in communicative relation with at least one network 16. As such, the interactive media object 20, and/or any of the contents thereof, may be stored on one or more media servers 12, generally indicated at block 112 of FIG. 3. Furthermore, the media servers 12 may preferably be disposed in communicative relation with at least one network 16, such as, for example, the Internet.

Moreover, the method 100 of at least one embodiment of the present invention may include either manually or automatically translating the contents of an editorial system, such as a newspaper, magazine, etc., into one or more languages or language formats. Accordingly, the integrated media system 10 of the present invention may be implemented in one or more of a plurality of languages without being limited to the language of any particular editorial system intended to be converted or otherwise presented as at least one embodiment of the integrated media system 10.

The method 100 of presenting the integrated media system 10 of the present invention as shown in FIG. 3 represents one preferred embodiment. Moreover, many alternative embodiments and/or variations within the intended spirit and scope of the present invention are contemplated. For example, the method of the present invention may include some or all of the described and/or represented steps, which may or may not be performed in a plurality of different orders.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. An integrated media system, comprising:
at least one media management system disposed in communicative relation with a plurality of client interfaces via a communication network, the plurality of client interfaces being structured to display interactive multimedia content thereon, a plurality of interactive media objects each comprising primary media content and secondary media content, said primary media content comprising at least one of textual or graphical content, and said secondary media content comprising at least one of audio or video content generated from said secondary media content, said secondary media content being supplementary to said primary media content, said primary media content and said secondary media content being simultaneously displayed adjacent one another on a common display screen, said media management system being structured to actively arrange said at least one of textual or graphical content of said primary media content to comprise a digital image rendition of any one of a plurality of hard copy formats, said digital image rendition of at least some of said primary media content comprising said hard copy format visually resembling a printed publication, said digital image rendition of said primary media content comprising a plurality of separate page displays wherein said interactive media object comprises navigation capabilities structured to facilitate successive navigation through said plurality of separate page displays of said primary media content, said navigation from one page display to a second, successive page display being structured to visually resemble page turning of a physical printed publication, said secondary media content being embedded in said digital image rendition of said primary media content, said secondary media content being structured at least for user activation thereof, wherein said media management system is structured to communicate said interactive media objects to the plurality of client interfaces, and said interactive media objects comprises at least one communication service displayed with each of said primary media content, said communication service being structured for at least user activation thereof.

2. The integrated media system as recited in claim 1 wherein said communication service is structured for use independently of or in combination with corresponding ones of said primary media content and said secondary media content.

3. The integrated media system as recited in claim 2 wherein at least some of said primary media content comprises at least one of said communication services being embedded into a corresponding one of said digital image renditions.

4. The integrated media system as recited in claim 3 wherein at least one of said plurality of communication services being structured for at least selective activation by direct access to said digital display rendition of said primary media content.

5. The integrated media system as recited in claim 4 wherein said communication service is structured to facilitate a live communication connection between a third-party recipient of said interactive media object and an author of said primary media content thereof.

6. The integrated media system as recited in claim 4 wherein said communication service is structured to facilitate a live communication connection between two third-party readers of a common one of said interactive media objects.

7. The integrated media system as recited in claim 1 wherein said media management system and the plurality of client interfaces are structured and disposed to operate over the Internet.

8. The integrated media system as recited in claim 1 further comprising a language translator structured to translate said textual content of said digital image rendition of said primary communication content into at least one of a plurality of languages.

9. The integrated media system as recited in claim 1 wherein said secondary media content is structured to be automatically activated upon display of said primary media content.

10. The integrated media system as recited in claim 1 wherein said secondary media content comprises an animated display.

11. The integrated media system as recited in claim 1 wherein said secondary media content comprises an audio feed.

12. The integrated media system as recited in claim 1 wherein said secondary media content comprises a video feed.

13. The integrated media system as recited in claim 1 wherein said communication service includes electronic mail.

14. The integrated media system as recited in claim 1 wherein said communication service comprises video conferencing.

15. The integrated media system as recited in claim 1 wherein said communication service comprises real-time chat.

16. The integrated media system as recited in claim 1 wherein said communication service comprises a voice-over-internet protocol.

17. A method of presenting an integrated media system, comprising:
receiving digital media content and generating a primary communication module and a secondary communication module therefrom, the primary communication module comprising primary media content including at least one of textual or graphical content generated from the digital media content, the secondary communication module comprising secondary media content including at least one of audio or video content generated from the digital media content, the secondary media content being supplementary to the primary media content,
selectively formatting said at least one of textual or graphical content of the primary media content to comprise a digital image rendition of any one of a plurality of hard copy formats, the digital rendition of the hard copy formats being structured to visually resemble a printed publication,
structuring the digital image rendition of the primary media content to include a plurality of separate page displays, wherein user activation of navigation capabilities is structured to facilitate successive navigation through the plurality of separate page displays, and wherein navigation from one page display to a second, successive page display visually resembles page turning of a physical printed publication,
displaying the secondary media content on at least one of the plurality of separate page displays of the digital image rendition immediately adjacent to the primary media content displayed thereon, structuring the secondary media content for at least user activation thereof during display on the at least one of the plurality of separate page displays of the digital image rendition, and associating a plurality of communication services with said primary communication module.

18. The method as recited in claim 17 comprising embedding at least one of said communication services into said digital image rendition of said primary communication module.

19. The method as recited in claim 18 comprising structuring said primary communication module for selective or automatic activation of said embedded communication service through access to the digital rendition.

20. The method as recited in claim 17 comprising structuring said secondary media content for selective or automatic activation upon display of corresponding primary media content.

21. The method as recited in claim 17 further comprising creating a plurality of interactive media objects each of which includes the digital image rendition.

22. The method as recited in claim 21 further comprising associating each of a plurality of primary communication modules with a different one of said plurality of interactive media objects.

23. The method as recited in claim 22 further comprising storing said interactive media objects onto a media server.

24. The method as recited in claim 23 further comprising translating said primary media content into one of a plurality of languages.

* * * * *